United States Patent [19]

Thevenin

[11] Patent Number: 4,832,904

[45] Date of Patent: May 23, 1989

[54] EMERGENCY COOLING DEVICE FOR A FAST NEUTRON NUCLEAR REACTOR

[75] Inventor: Michel Thevenin, Fresnes, France

[73] Assignee: Novatome, Courbevoie, France

[21] Appl. No.: 87,287

[22] Filed: Aug. 20, 1987

[30] Foreign Application Priority Data

Aug. 20, 1986 [FR] France ................... 86 11892

[51] Int. Cl.[4] ............................................. G21C 15/18
[52] U.S. Cl. ..................................... 376/299; 376/403
[58] Field of Search ............... 376/282, 298, 299, 402, 376/403, 404, 405

[56] References Cited

U.S. PATENT DOCUMENTS 4,115,192 9/1978 Jogand ................................. 376/298
4,367,194 1/1983 Schenewerk et al. ............... 376/282

FOREIGN PATENT DOCUMENTS 2506498 11/1982 France .
2555794 5/1985 France .

Primary Examiner—Charles T. Jordan
Assistant Examiner—Richard W. Wendtland
Attorney, Agent, or Firm—Pollock, Vande Sande & Priddy

[57] ABSTRACT

The cooling device comprises a heat exchanger (7) immersed in the hot header (4) of the nuclear reactor vessel, a substantially vertical tubular conduit (14) passing through the stepped wall (2) vertically below the exchanger (7), a bell (16) fixed under the exchanger (7) in the extension of its lower part and a mechanism for compressing inert gas and relieving pressure in the internal space of the bell (16). The inert gas compressed in the bell (16) enables the liquid metal in the hot header (4) to be completely separated from the liquid metal in the cold header (5). When the pressure in the bell (16) is relieved, the outlets (10) for the cooled liquid metal in the exchanger (7) are brought into communication with the cold header (5) through the bell (16) and the conduit (14).

7 Claims, 1 Drawing Sheet

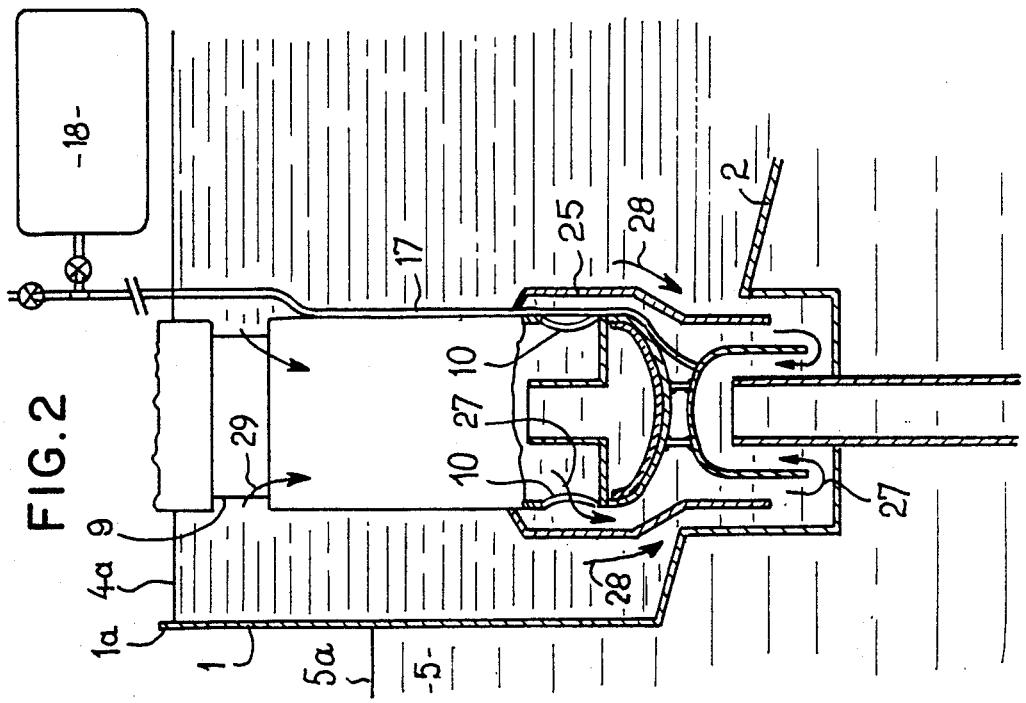
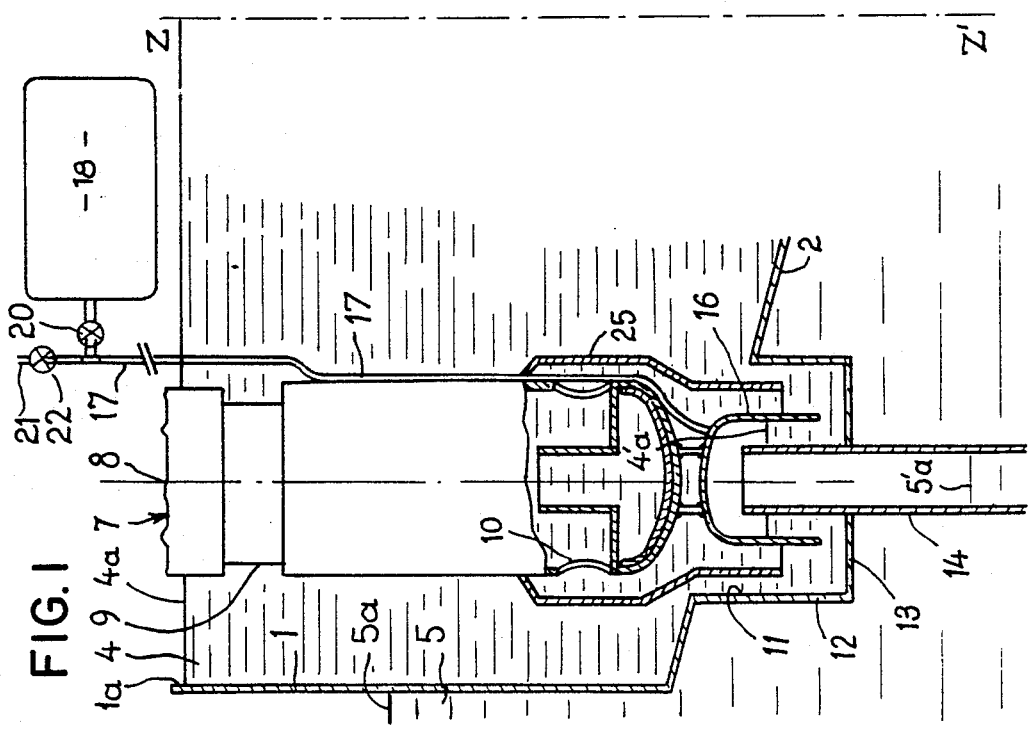

EMERGENCY COOLING DEVICE FOR A FAST NEUTRON NUCLEAR REACTOR

FIELD OF THE INVENTION

The invention relates to an emergency cooling device for a fast neutron nuclear reactor of integrated type.

BACKGROUND OF THE INVENTION

Fast neutron nuclear reactors of integrated type comprise a main vessel containing liquid metal such as sodium, forming the liquid for cooling the nuclear reactor in which is immersed the reactor core consisting of fuel assemblies. The main vessel of the reactor is divided internally into two regions, by means of a complex structure forming the inner reactor vessel. This complex structure is equivalent to a wall, a part of which, known as a stepped wall, extends radially relative to the main vessel.

Of the two regions bounded by the inner vessel, the first is arranged substantially in the upper part of the vessel and the other in the lower part. The upper region, known as the hot header, communicates with the core outlet and receives the hot liquid metal which has passed through the core fuel assemblies. The lower region, known as the cold header, receives the sodium cooled in the intermediate exchangers immersed in the main reactor vessel. This cooled liquid metal is then conveyed from the cold header to the lower part of the core assemblies.

When a nuclear reactor has operated for a certain period of time, it continues to release significant residual power when it is stopped, i.e. when the reactor control rods are inserted into the core, in their maximum insertion position. The residual power of the reactor must therefore be removed to avoid damage to internal components and structures owing to an excessive temperature rise.

This possibility of removing the residual reactor power must be maintained even when the reactor has undergone major breakdowns and when the main power removal circuits, which are employed when the reactor runs normally, are out of action.

Emergency circuits are therefore resorted to, these being used only when the reactor is stopped and when the main circuits are out of action.

In the case of fast neutron nuclear reactors cooled by liquid sodium and of an integrated type, use is made of emergency heat exchangers immersed in the reactor vessel, inside the hot header. These emergency heat exchangers, in which the liquid sodium reactor coolant circulates, are associated with heat exchangers of the sodium-air type, arranged outside the reactor vessel and responsible for cooling the secondary liquid sodium which has been heated by coming into thermal contact with the primary sodium reactor coolant, passing through the exchanger immersed in the vessel. These emergency exchangers, associated with sodium-air exchangers, form circuits which are completely independent of the main circuits.

The emergency exchangers, which are immersed directly in the hot header of the vessel, comprise inlet openings for the sodium to be cooled in their upper part and outlet openings for the cooled sodium in their lower part. The cooled sodium is therefore reintroduced into the hot header and must follow a complicated path in order to travel into the cold header and, from there, to return to the lower part, or bottom, of the fuel assemblies. This complex path includes passing through pumps and the bodies of the intermediate exchangers of the main power removal circuits. This results in fairly large pressure drops, reduced efficiency of the reactor emergency cooling device and considerable temperature dissymmetries in the hot header, leading to additional thermal stresses on the stepped wall.

SUMMARY OF THE INVENTION

The objective of the invention is therefore to provide an emergency cooling device for a fast neutron nuclear reactor of integrated type having a main vessel containing liquid metal in which the reactor core is immersed and comprising a wall dividing the inner space of the vessel into an upper region receiving the hot liquid metal which has passed through the reactor core, called the hot header, and a lower region receiving cooled liquid metal, called the cold header, this wall comprising a part extending in the radial direction from the vessel, called the stepped wall, and the emergency cooling device comprising at least one heat exchanger immersed in the hot header and having outlet openings for the cooled liquid metal in its lower part, the device being highly efficient and very simple to use.

To this end, the cooling device according to the invention also comprises:

a substantially vertical tubular conduit passing through the stepped wall vertically below the exchanger, whose lower end opens into the cold header and whose upper end opens into the hot header, below the lower part of the exchanger;

a bell fixed onto the heat exchanger, in the extension of its lower part, open downwards and arranged so as to cap the upper part of the conduit while providing a free space around this upper part; and a means for compressing inert gas and for relieving pressure in the inner space of the bell enabling the liquid metal in the hot header to be completely separated from the liquid metal in the cold header, by means of compressed inert gas, or of bringing the outlet for the cooled liquid metal from the heat exchanger into communication with the cold header, by means of the bell and the conduit.

BRIEF DESCRIPTION OF THE DRAWINGS

In order that the invention may be more clearly understood, a description will now be given, by way of example and without implying any limitation, with reference to the attached drawings, of an embodiment of a cooling device according to the invention, employed in a fast neutron nuclear reactor cooled with liquid sodium.

FIG. 1 is a partially sectioned elevation view of the cooling device in position in the vessel of the nuclear reactor, during the normal operation of the reactor.

FIG. 2 is a partially sectioned elevation view of the cooling device in position in the vessel of the nuclear reactor, during a reactor stoppage, with the emergency cooling brought into operation.

DESCRIPTION OF PREFERRED EMBODIMENT

FIGS. 1 and 2 show the inner vessel 1 of a fast neutron nuclear reactor consisting of cylindrical shells with a vertical axis, such as 1a and of a frusto-conical stepped wall 2, bounding a hot header 4 and a cold header 5 inside the reactor vessel.

The cylindrical shells of the inner vessel 1 are either shells whose axis is the axis Z—Z' of the vessel (FIG. 1), or shell passages for the intermediate exchangers and the pumps through the stepped wall 2.

In FIGS. 1 and 2, the inner vessel is shown in the form of a simple wall, in order to avoid complicating the description, but this vessel is generally more complex in structure; nevertheless, in its function of separating the hot header from the cold header, this structure is equivalent to a simple wall such as shown.

The part of the stepped wall 2 which is shown in FIGS. 1 and 2 is frusto-conical in shape and extends in the radial direction from the main reactor vessel whose axis of symmetry of revolution Z—Z' is shown in FIG. 1.

It can be seen that the hot header 4, situated above the stepped wall 2, is at a height which is generally above the height of the cold header 5, situated below the stepped wall 2. The shape and the structure of the stepped ramp provide a means of communication between the hot header 4 and the core outlet, i.e., its upper part in which the heads of the assembly are situated. The hot header 4 thus collects the sodium which has been heated in the core while travelling upwards in contact with the fuel assemblies. The upper level 4a of the hot sodium in the header 4 is shown, this level being substantially constant when the reactor operating parameters themselves remain constant. However, this level is a dynamic level which is established in the course of the sodium circulation, which will be described below.

The cold header 5 is in communication with the lower part of the core, corresponding to the bottoms of the assemblies into which is injected the cooled sodium whose level is established at 5a when the reactor is in operation.

The reactor's intermediate exchangers and pumps forming the members of the normal reactor cooling circuit pass through the stepped wall 2 by means of passage devices enabling the hot sodium from the header 4 to be separated from the cooled sodium in the header 5. The intermediate heat exchangers comprise openings for entry into the hot header in their upper part and openings for exit into the cold header in their lower part. The hot sodium in the header 4 enters the intermediate exchangers, in which it is cooled by secondary sodium, the heat removed by this secondary sodium being employed to vaporize water in the steam generators situated outside the reactor vessel. The cooled sodium leaving the intermediate exchangers is collected in the cold header 5 and is injected into the lower part of the core by virtue of the pumps. This cooled sodium passes upwards through the core, becoming heated, before returning into the hot header 4.

FIGS. 1 and 2 show an emergency exchanger 7 immersed in the sodium in the hot header 4 comprising sodium inlet openings 9 in its upper part and sodium outlet openings 10 in its lower part. An emergency exchanger such as exchanger 7 is well known to the prior art and, inside its outer casing immersed in the liquid sodium in the vessel, comprises a bundle of tubes inside which liquid sodium flows, making it possible to remove the heat from the primary liquid sodium entering the exchanger casing 7 via the openings 9. The primary sodium leaving via the openings 10 has thus been subjected to cooling when the heat exchanger 7 is in operation.

The liquid sodium passing through the tubes of the exchanger 7 bundle is in its turn cooled, outside the vessel, in a sodium-air exchanger, the whole of the heat exchanger 7, of the sodium-air exchanger and of their connecting pipework forming a cooling device according to the prior art. This cooling device is used when the nuclear reactor is stopped, to remove the residual heat from this reactor. As can be seen in FIGS. 1 and 2, to implement the invention, the stepped ramp 2 is pierced with an opening 11 centered on the axis 8 of the exchanger 7.

A cylindrical shell 12 whose diameter is greater than the diameter of the exchanger 7 is fastened to the stepped ramp 2 by welding along the outline of the opening 11. This shell enters the interior of the cold header 5 over a certain height, an annular bottom 13 being fastened by welding to its lower end. A vertical tubular conduit 14 is fastened, along the central opening of the bottom 13 which is centered on the axis 8 of the exchanger 7. The tubular conduit 14 is coaxial with the casing of the exchanger 7. The lower end of the vertical conduit 14 is situated in the cold header 5 and the upper end of this conduit in the hot header 4, slightly below the lower end of the casing of the exchanger 7. A bell 16 which is open at the bottom is fixed to the lower end of the casing of the exchanger 7, in the vertical extension of this casing. When the exchanger 7 is in position in the reactor vessel, the bell 16 caps the top end of the tube 14; having a cross-section larger than that of the conduit 14, this bell 16 provides a free space all around the top end of the conduit 14. The top end of the conduit 14 thus, emerges, inside the hot header 4, under the bell 16, at a certain axial distance below its upper inner surface. The bell 16 is connected by a tube 17 fixed along the casing of the exchanger 7 to a storage tank of compressed argon 18 arranged outside the nuclear reactor vessel. The storage tank 18 is equipped with a stop valve or stopcock 20 which makes it possible to direct argon into the pipeline 17 and into the bell 16, or to isolate the pipeline and the bell from the storage tank 18. A vent pipe 21 connected to the low pressure effluent circuit is also arranged as a branch on the tube 17, upstream of the storage tank 18, this vent pipe 21 being fitted with a valve 22.

A shell 25 whose top end surrounds the lower part of the casing of the exchanger 7 and whose lower part, smaller in diameter than the top part, enters the space provided by the shell 12, is fixed on the casing of the exchanger 7, at a height above the height of the cooled sodium outlet openings 10. In its lower part, the shell 25 has a diameter which is only slightly smaller than the diameter of the shell 12, providing a small clearance between the shells 12 and 25.

In FIG. 1, the cooling device has been shown at a stage when the reactor is operating normally, the emergency exchanger 7 being stopped. During this stage of normal operation of the reactor, the bell 16 and the vertical tubular conduit 14 contain argon under pressure originating from the storage tank 18. This argon is at a sufficient pressure to maintain a hot liquid sodium level 4'a in the bell 16 and a cooled liquid sodium level 5'a in the tube 14. Thus, in the top part of the conduit 14 and in the bell 16, the argon forms a plug of gas which completely isolates the hot sodium contained in the header 4 from the cooled sodium contained in the header 5. The circulation of the liquid sodium in the nuclear reactor vessel is then identical to the circulation of the sodium in a vessel in which a conduit such as conduit 14 does not pass through its stepped ramp.

As can be seen in FIG. 2, when the nuclear reactor is stopped and when the cooling device is operating, the argon previously contained in the conduit 14 and the bell 16 is evacuated, the conduit and the bell being then filled with liquid metal. In order to produce this evacuation of the conduit and of the bell, the vent pipe 21 is connected to the low-pressure effluent circuit, with the valve 20 closed. This brings the hot header 4 into communication with the cold header 5, by means of the bell 16 and of the conduit 14. The cooled sodium leaving the exchanger 7 via the openings 10 is then conveyed directly into the cold header, by means of the bell 16 and the conduit 14 (arrows 27). The cooled sodium is channelled by the shell 25, which makes it possible to prevent contact between the sodium cooled in the exchanger 7 and the stepped wall 2, a contact which would result in severe thermal shocks.

Only the hot sodium (arrows 28) comes into contact with the stepped ramp.

To switch from the operating mode shown in FIG. 2 to the operating mode shown in FIG. 1 it is sufficient to convey argon into the pipeline 17 and the bell 16 by opening the valve 20.

The manoeuvres in order to switch from one operating mode to the other are thus very simple and very quick.

In the case where the emergency cooling device is in operation (FIG. 2), the cooled sodium is conveyed directly into the cold header, without having to pass through the intermediate exchangers. This cooled sodium, collected in the cold header, is conveyed into the lower part of the core, passes upwards through the core while being heated and returns into the hot header. The liquid metal in the header 4 enters the exchanger 7 via the openings 9 (arrows 29). During the emergency cooling the primary sodium circuit is therefore very simple, forming a single loop with a hot part comprising the core and the hot header and a cold part comprising the cold header. It can thus operate by natural convection. This results in very high efficiency and a very satisfactory output of the cooling device. Furthermore, the temperatures in the headers are more uniform, and this reduces the local heat stresses.

In addition, it is possible to provide a shell 12 of great length, so that this shell 12 enters deep inside the cold header. This makes it possible to employ an emergency exchanger 7 of increased length and hence of smaller diameter. An exchanger of this kind is then lower in cost, for equivalent performance.

Furthermore, in the event of the main vessel being pierced, the return from the hot header to the cold header is ensured naturally, without the need to impose constraints on the height of the entry window of the intermediate exchanger. Lastly, it should be noted that, should an incident occur in respect of the opening of the valve 22, the system would no longer provide sealing between the two headers but would operate as a cooling device, thus tending towards safety.

Although a single exchanger associated with a tubular conduit passing through the stepped ramp and with a bell fixed to the exchanger has been described, the cooling device according to the invention may incorporate several emergency exchangers each associated with a conduit passing through the stepped wall and a bell capping the conduit.

The invention applies to any fast neutron nuclear reactor of integrated type, whatever the form of the stepped wall or ramp of its inner vessel.

What is claimed is:

1. In a pool type liquid metal cooled fast breeder reactor having a pressure vessel filled with liquid metal, a reactor core immersed in said liquid metal, a wall dividing said pressure vessel into an upper region or hot header receiving heated liquid metal which has passed through said reactor core, a lower region or cold header receiving cooled liquid metal from a heat exchanger, said wall having a portion or stepped wall extending in a radial direction of said pressure vessel, and an emergency core cooling system comprising at least one heat exchanger immersed in said hot header and having upper inlet and lower outlet openings for cooled liquid metal, the improvement wherein said emergency core cooling system further comprises (a) a substantially vertical tubular conduit passing through said stepped wall vertically below said exchanger and having a lower end opening into said cold header and an upper end opening into said hot header, below a lower part of said exchanger;

(b) a bell fixed to said heat exchanger in an extension of its lower part, open at the bottom and arranged so as to cap a top part of said conduit while providing a free space around said top part; and (c) means for compressing inert gas and for relieving the pressure in an inner space of said bell, enabling complete separation of said liquid metal in said hot header from said liquid metal in said cold header, by means of compressed inert gas, or to bring cooled liquid lower metal outlet openings of said heat exchanger into communication with said cold header by means of said bell and of said conduit.

2. Emergency cooling system according to claim 1, further comprising a shell fixed to a casing of said heat exchanger above said outlet openings for cooled liquid metal surrounding said lower part of said heat exchanger and extended downwards so as to surround said bell over at least a part of its height and said top part of said tubular conduit.

3. Emergency cooling system according to claim 1 or 2, wherein said inner space of said bell is connected by a pipeline to a storage tank for compressed inert gas, arranged outside the reactor vessel.

4. Emergency cooling system according to claim 3, wherein said liquid metal is sodium, and said inert gas is argon.

5. Emergency cooling system according to claim 3, wherein a valve is arranged in said pipeline at an entry of said storage tank, and a vent pipe, in which a further valve is placed, is arranged as a branch on said pipeline.

6. Emergency cooling system according to claim 1, wherein said stepped wall is pierced with an opening vertically below said heat exchanger, a shell with a vertical axis is fixed on said stepped ramp along said opening, so as to project downwards inside said cold header, and said tubular conduit is fixed in a central opening of an annular bottom forming an integral part of the end of said shell opposite said opening in said stepped wall.

7. Emergency cooling system according to claim 6, wherein a shell forming an integral part of said lower part of said heat exchanger is extended downwards, inside a shell forming an integral part of said stepped wall, and has a diameter which is slightly smaller than a diameter of said shell forming an integral part of said stepped wall.

* * * * *